Aug. 11, 1959   H. M. NORMAN ET AL   2,899,617
METADYNE DRIVE ARRANGEMENT
Filed June 16, 1958   2 Sheets-Sheet 1
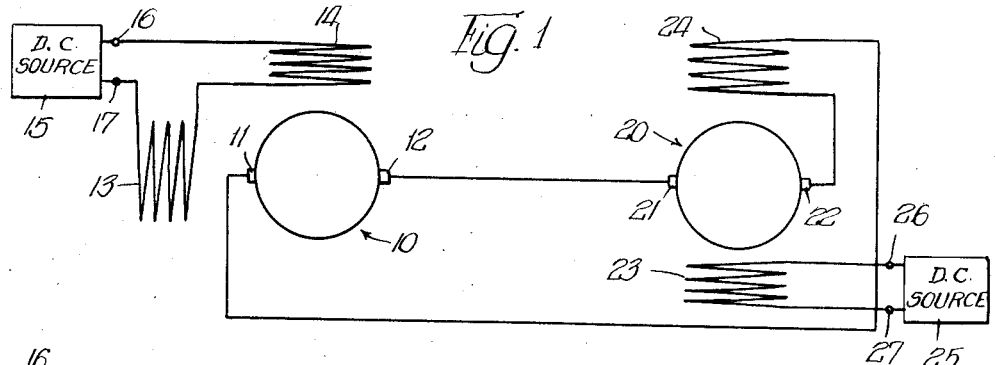
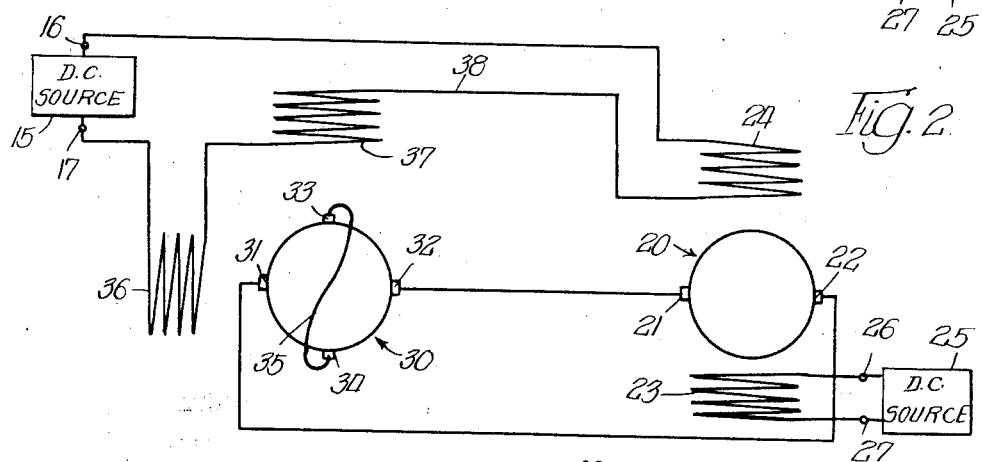
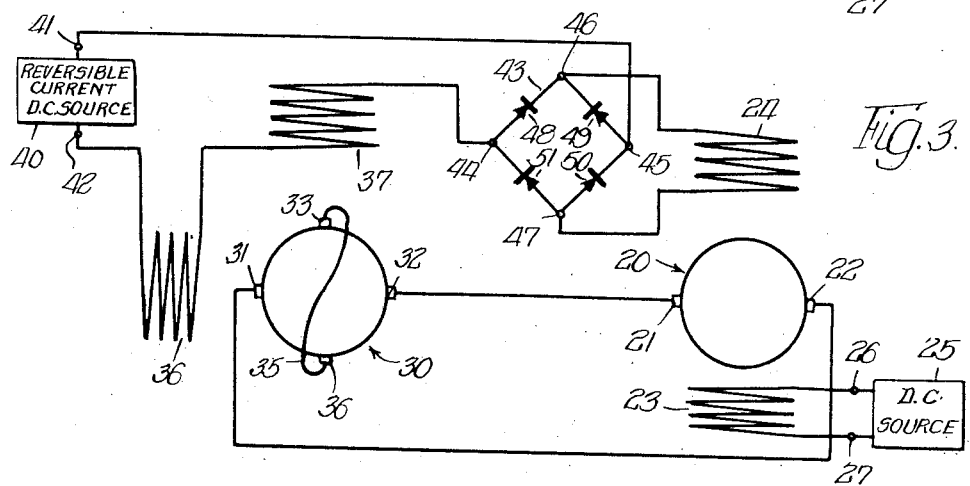
INVENTORS.
Horace M Norman
Hans R. A. Hansen
BY
Byron, Hume, Gwen & Clement
ATTYS Aug. 11, 1959  H. M. NORMAN ET AL  2,899,617
METADYNE DRIVE ARRANGEMENT
Filed June 16, 1958  2 Sheets-Sheet 2
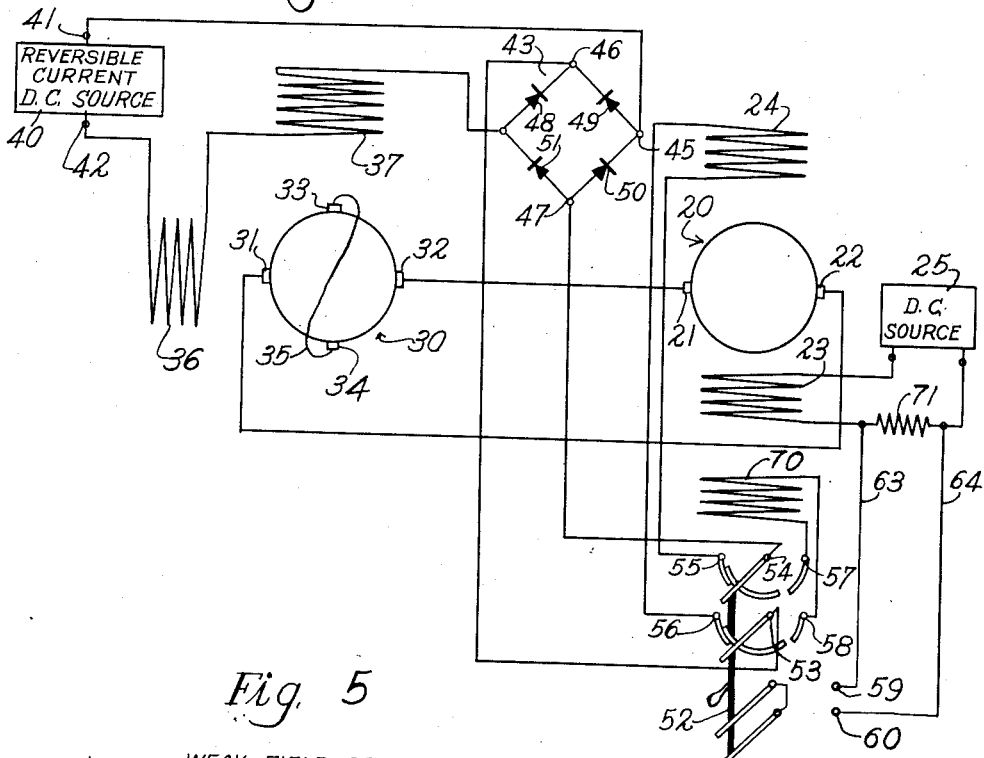
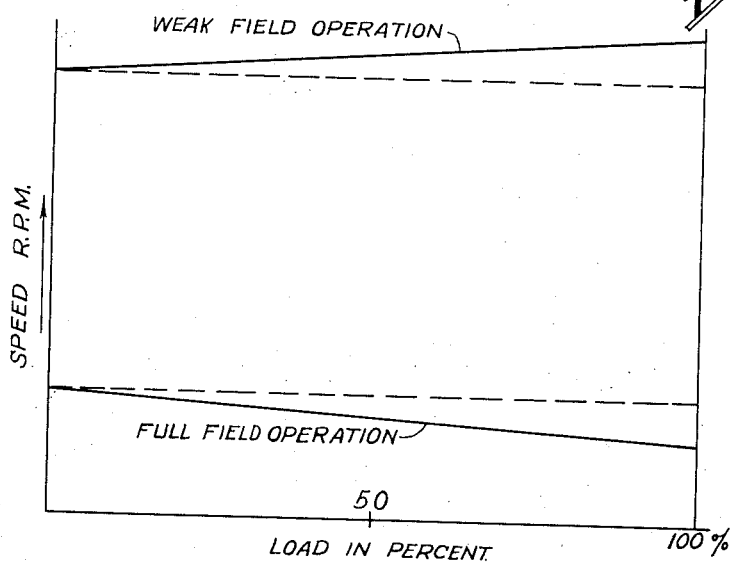
INVENTORS.
Horace M. Norman
BY Hans R. A. Hansen
Byron Hume Groen & Clement
Attys.

United States Patent Office 2,899,617
Patented Aug. 11, 1959

2,899,617

METADYNE DRIVE ARRANGEMENT

Horace M. Norman and Hans R. A. Hansen, Milwaukee, Wis., assignors to The Louis Allis Co., Milwaukee, Wis., a corporation of Wisconsin Application June 16, 1958, Serial No. 742,438

9 Claims. (Cl. 318—154)

The present invention relates to a drive arrangement for D.C. motors, and particularly to an improved arrangement for controlling the effective main pole strength as the armature current changes due to the change of load.

This application is a continuation-in-part of applicants' co-pending application, Serial No. 662,236, filed May 28, 1957.

In D.C. motor machinery, one method by which motor speed can be controlled is to set the motor field voltage and vary the armature load current. When the field voltage is set at or near saturation, the motor is said to be at "full field operation" and is operative in its low speed range. When the field voltage is set well below saturation, the motor is said to be at "weak field operation" and is operative in its high speed range. The armature load current varies both with speed and with load and produces a demagnetizing effect on the main field poles. The demagnetizing effect operates so that at full field operation, the motor has a falling speed characteristic with increasing load and for weak field operation, the motor has a rising speed characteristic with increasing load.

It is conventional practice in D.C. motor machinery to employ in addition to the main field winding, a series field winding for correcting the demagnetizing effect on the main poles that is caused by the armature load current. For weak field operation, the series winding, otherwise referred to hereinafter as the auxiliary winding, is connected in series with the armature and is wound so as to produce a field which is additive to the field produced by the main field winding. This arrangement compensates for the rising speed characteristic with increasing load of the drive motor. For full field operation, the auxiliary winding is connected in series with the armature and is wound so as to produce a field which is subtractive to the field produced by the main field winding. This arrangement compensates for the falling speed characteristic with increasing load of the drive motor in the circumstance of full field operation.

In non-reversible motors, no problem is presented with regard to the described manner of connection for the series winding. However, in reversible motors where the field polarity is maintained constant and the armature current is reversed, provision must be made for reversing the terminal connections of the series winding each time that the armature current is reversed in order to maintain the polarity of the series winding fixed. Any form of terminal connection reversing arrangement is not desirable because it usually requires mechanical switching which necessarily absorbs some power from the drive system, and adds to the complexity and diminishes the efficiency of the machine.

Another difficulty experienced in drive motors of high armature current ratings is that in the series connected winding arrangement it is often not possible to adjust both the current flow and the turns of the series winding to produce the desired effects without the inclusion of a current divider arrangement which is generally undesirable in that it contributes to the load on the drive system and diminishes the efficiency of the machine.

It is an object of the present invention to provide a new and improved drive arrangement for D.C. motors including circuitry independent of the motor armature for substantially proportionalizing the auxiliary winding current to the motor armature current.

An additional object of the invention is to provide an improved drive arrangement for reversible D.C. motors including circuitry independent of the motor armature for proportionalizing the current in the auxiliary winding to that in the armature and for maintaining the direction of current flow through the auxiliary winding fixed without regard to the direction of the current flow through the armature.

A specific object of the invention is to provide an improved drive arrangement for a reversible D.C. motor including a metadyne generator wherein a weak control field input signal is amplified and produces a substantially proportional output armature current which output current is applied directly to the armature of the D.C. motor, and wherein the motor auxiliary winding is connected in series with the control field winding of the generator so that the current flow through the auxiliary winding is substantially proportional to but substantially less than the current flow through the armature of the D.C. motor.

Another object of the invention is to provide an improved drive system for reversible D.C. motors including a metadyne generator wherein a weak control field current is amplified to produce a substantially proportional output armature current which is applied to the armature of the motor and wherein the auxiliary winding of the D.C. motor is connected in series with the control field winding of the metadyne generator through a bridge rectifier so that in response to reversal of the control field current the motor armature current is reversed but the auxiliary winding current is not reversed.

An additional object of the invention is to provide an improved drive system for reversible D.C. motors including a metadyne generator wherein a weak control field current is amplified to produce a substantially proportional output armature current which is applied to the armature of the motor and wherein the auxiliary winding of the D.C. motor is connected in series with the control field winding of the metadyne generator through a bridge rectifier so that in response to reversal of the control field current the auxiliary winding current is not reversed, and wherein the auxiliary winding of the D.C. motor is arranged so that at full field operation the field produced by the auxiliary winding is subtractive to the field produced by the main field winding, and for weak field operation the field produced by the auxiliary winding is additive to the field produced by the main field winding.

Further objects and features of the invention pertain to the particular circuit elements and the arrangement thereof in the motor drive system of the invention whereby the above outlined and additional operating features are attained.

The invention, both as to its arrangement and mode of operation, will be better understood by reference to the following specification and drawings wherein:

Figure 1 shows in schematic form a conventional motor-generator drive arrangement wherein the motor auxiliary winding is connected in series with the motor armature;

Figure 2 shows in schematic form a drive system in accordance with the invention in which the motor auxiliary winding is connected in series with the generator field winding and the current control source;

Figure 3 shows in schematic form a variation of the drive system of Figure 2, wherein the motor auxiliary winding is connected in series with the generator field winding and a reversible current control source through a bridge rectifier;

Figure 4 shows in schematic form a drive system in accordance with the invention including two auxiliary motor windings alternatively connectible in series with the generator field winding and the current control source; and Figure 5 is a plot of speed against load of the drive motor under conditions of weak field operation and under conditions of full field operation.

Referring to the drawings, there is shown in Fig. 1 a conventional motor-generator drive arrangement including a generator 10 and a D.C. motor 20. The generator 10 includes a pair of output armature brushes 11 and 12 and field control windings 13 and 14 connected in series across the output terminals 16 and 17 of a D.C. source 15. The D.C. motor 20 includes a pair of input armature brushes 21 and 22, a main field winding 23 and an auxiliary winding 24. The main field winding is connected at its terminals to the output terminals 26 and 27 of a D.C. source 25 and the auxiliary winding 24 is connected in series with the armature brushes 11 and 12 of the generator 10 and the armature brushes 21 and 22 of the motor 20.

In the D.C. motor 20, the main field winding 23 is arranged about the poles of the stator (not shown) to produce in the motor a fixed field. The auxiliary winding 24 is connected in the series circuit to produce in normal operation a field additive to the field produced by the main field winding 23. However, it is clear that the field produced by the series connected auxiliary winding can be additive for only one direction of current flow therethrough so that the arrangement of Fig. 1 cannot be employed for a reversible motor where reversal is controlled by reversing the armature current. Taking into consideration the current flow through the armature of the motor 20, the auxiliary winding 24 is given the proper number of turns so that the demagnetization of the main poles due to the armature current is reduced to a minimum.

Considering now the arrangement of Fig. 2, there is shown therein an improved drive arrangement in accordance with the invention including a metadyne generator 30 and a D.C. motor 20, the latter unit being identical in structure but not in connection to the motor unit illustrated in Fig. 1. As represented schematically, the metadyne generator includes a pair of output armature brushes 31 and 32, a pair of shorted brushes 33 and 34 connected by means of a conductor 35, and field control windings 36 and 37. The field windings 36 and 37 are connected in a series circuit 38 with the auxiliary winding 24 of the motor 20 to the output terminals 16 and 17 of the D.C. source 15.

The metadyne generator 30 is characterized as being responsive to light currents applied to the field windings 36 and 37 thereof for producing a heavy armature current at the output brushes 31 and 32 that is substantially proportional to the applied field current. Accordingly, in the arrangement shown in Fig. 2, the armature current applied at the armature brushes 21 and 22 of the motor 20 is greater than but substantially proportional to the current provided from the D.C. source 15. As the current through auxiliary winding 24 is identical to the field current through the windings 36 and 37, the current in the auxiliary winding is less than but substantially proportional to the armature current of the motor 20. Taking in consideration the current flow through the auxiliary winding 24 and the current flow through the armature of the motor 20, the auxiliary winding 24 may be given the proper number of turns so that the demagnetization of the main poles due to the armature current is reduced to a minimum. In this arrangement, the current flow through the auxiliary winding 24 is substantially proportional to and substantially less than the current flow through the armature of the motor 20 so that it is possible and convenient to accurately control the ampere-turns of the auxiliary winding 24 in order to more accurately neutralize the armature demagnetization effects in the D.C. motor 20 over that attainable in the arrangement of Fig. 1, because the auxiliary winding has more turns than the series winding of a conventional motor.

Referring now to the arrangements shown in Fig. 3, the structural components of the metadyne generator 30 and of the D.C. motor 20 are identical to those units shown in Fig. 2. However, in this arrangement there is included a reversible current D.C. source 40 having output terminals 41 and 42 and a bridge rectifier 43 having input terminals 44 and 45 and output terminals 46 and 47 and including in its branch arms the diodes 48, 49, 50 and 51. The field control windings 36 and 37 of the generator 30 are connected in series with the reversible current source 40 at its terminals 41 and 42 and with the bridge rectifier 43 at its input terminals 44 and 45. Accordingly, the direction of current flow through the windings 36 and 37 conforms exactly to the direction of the reversible current provided by the source 40 and as the current through the control windings 36 and 37 reverses, so does the current through the armature of the D.C. motor 20 reverse, thereby causing the direction of rotation of the armature to be reversed. The auxiliary winding 24 of the motor 20 is connected across the output terminals 46 and 47 of the bridge rectifier 43 and in this arrangement, irrespective of the direction of current flow through the control windings 36 and 37, the current flow through the auxiliary winding 24 remains fixed. As explained above, the auxiliary winding 24 is arranged and connected so that the field produced by the current flow therethrough is additive to the field provided by the main field winding 23. Assuming the proper ampere-turns relationship between the auxiliary winding 24 and the armature of the motor 20, the auxiliary winding 24 completely neutralizes the armature demagnetization of the main poles irrespective of the direction of current flow through the armature inductors without the inclusion of a complex switching arrangement.

It is noted that the auxiliary windings shown in Figs. 2 and 3 are specified as being arranged and connected so as to produce a field that is additive to the field provided by the main field winding 23. This arrangement is effective for modifying the rising speed characteristic with increasing load of the motor under the condition of weak field operation. For full field operation, the structures of Figures 2 and 3 could be maintained substantially as shown therein except that the auxiliary winding in each of the figures must be arranged and connected so that the field produced by the current flow therethrough is subtractive to the field provided by the main field windings 23. In this arrangement, the auxiliary windings would be effective for neutralizing the falling speed characteristic with increasing load of the motor under full field operation.

It is appreciated that the arrangements shown in Figures 2 and 3 are effective for only one type of field operation. An arrangement which may be utilized for both full operation and weak field operation is shown in Figure 4. The arrangement of Figure 4 includes all of the components of Figure 3 wherein the auxiliary winding 24 is for convenience here identified as the first auxiliary winding. Additionally, there is included a second auxiliary winding 70, a load resistor 71 connected in series with the main field winding 23, and a two-pole double throw switch 52. The second auxiliary winding 70 is oppositely wound with regards to the first auxiliary winding 24 so that if the field produced by the first auxiliary winding 24 is additive relative to the field produced by the main field winding 23, the field produced by the second auxiliary winding 70 is subtractive relative to the field produced by the main field winding 23. The two-pole double throw switch 52 has its center contacts 53 and 54 connected respectively to the terminals 46 and 47 of the rectifier 43, one pair of poles 55 and 56 of the double throw switch 52 being connected to the first auxiliary winding 24, a second pair of poles 57 and 58 are connected to the ends of the second auxiliary winding 70 and a third pair of poles 59 and 60 are connected across the terminals of the load resistor 71.

In the arrangement shown, with a double throw switch 52 thrown in the direction so as to complete contact with the terminals 55 and 56, a circuit is completed through the first auxiliary winding 24 which is the equivalent of the circuit shown in Figure 3. In this arrangement, the load resistor 71 is included in series with the main field winding 23 thereby to indicate the weak field operation stage of the motor 20. In the alternative operational state, the switch 52 is thrown so as to complete contact with the pair of contacts 57 and 58, and the pair of contacts 59 and 60. In this arrangement, a second auxiliary winding 70 is energized from the rectifier unit 43 and a circuit is completed by the conductors 63 and 64 for shunting the load resistor 71 whereby the motor is operated in its full field operational state. In the second arrangement, the field produced by the second auxiliary winding 70 is subtractive to the field provided by the main field winding 23. Assuming the auxiliary winding 70 has the proper ampere-turns relationship with other windings of the motor, this winding 70 can maintain the speed of the motor substantially constant irrespective of the load or the direction of rotation of the motor.

While it is considered that the arrangements of the invention disclosed are to be preferred, it is understood that variations and modifications may be made therein, and it is intended to cover in the appended claims all such modifications as fall within the true spirit and scope of the invention.

What is claimed is:

1. A drive system including a D.C. drive motor provided with an armature and a main field winding and an auxiliary field winding, a generator provided with an armature and a control field winding for which the output armature current is substantially proportional to the input field current, a series connection between the armatures of said generator and of said motor whereby the current through the motor armature is proportional to the current in the control field winding of said generator, a current source, and a connection from said current source for applying the output current thereof through said generator field winding and said auxiliary field winding, whereby the current through the auxiliary field winding of said motor is substantially proportional to the current through the armature of said motor.

2. The drive system set forth in claim 1, wherein said generator is a metadyne machine.

3. A drive system including a D.C. drive motor provided with an armature and a main field winding and an auxiliary field winding, a current source connected to said main field winding, a metadyne generator provided with an armature and a control field winding wherein the output armature current is substantially proportional to the input field current, a series connection between the armature of said generator and of said motor whereby the current through the motor armature is proportional to the current in the field winding of said generator, a control current source, and a connection from said control current source for applying the current output thereof through said generator control field winding and said auxiliary field winding, whereby the current through the auxiliary field winding of said motor is substantially proportional to the current through the armature of said motor.

4. A drive system including a reversible D.C. drive motor provided with an armature and a main field winding and an auxiliary field winding, a current source connected to said main field winding, a metadyne generator provided with an armature and a control field winding wherein the output armature current is substantially proportional to the input field current, a series connection between the armatures of said generator and of said motor whereby the current through the motor armature is proportional to the current in the field winding of said generator, a reversible current control source, and a connection from said reversible current control source including said generator control field winding and the auxiliary field winding of said motor for applying the reversible current output thereof bi-directionally through said generator control field winding and uni-directionally through said auxiliary field winding, whereby in the auxiliary field winding of said motor the direction of current flow is fixed and the magnitude of current flow is substantially proportional to that of the current through the armature of said motor.

5. A drive system including a reversible D.C. drive motor provided with an armature and a main field winding and an auxiliary field winding, a current source connected to said main field winding, a metadyne generator provided with an armature and a control field winding wherein the output armature current is substantially proportional to the input field current, a series connection between the armatures of said generator and of said motor whereby the current through the motor armature is proportional to the current in the field winding of said generator, a reversible current control source, and a control circuit from said reversible current control source including said generator control field winding and the auxiliary field winding of said motor for applying the reversible current output thereof bi-directionally through said generator control field winding for controlling the direction of current flow in said motor armature in accordance with the direction of current flow from said reversible current control source thereby to control the direction of rotation of said motor armature and for applying the reversible current output thereof uni-directionally through said auxiliary field winding for producing in said motor a field additive to the field produced by said main field winding thereby to maintain the motor field strength substantially constant for various armature currents, whereby the main field correction provided by the auxiliary winding of said motor is of a fixed polarity and is substantially proportional to the armature current irrespective of the direction of the motor armature rotation.

6. A drive system including a reversible D.C. drive motor provided with an armature and a main field winding and an auxiliary field winding, a current source connected to said main field winding, a metadyne generator provided with an armature and a control field winding wherein the output armature current is substantially proportional to the input field current, a series connection between the armatures of said generator and of said motor whereby the current through the motor armature is proportional to the current in the field winding of said generator, a reversible current control source, a bridge rectifier, a series connection between said reversible current control source and the input terminals of said bridge rectifier through the generator control field winding for applying the reversible current of said control source bi-directionally through said generator control field winding in order to control the direction of current flow in said motor armature in accordance with the direction of current flow from said reversible current control source thereby to control the direction of rotation of said motor armature, and a connection between the output terminals of said bridge rectifier through the auxiliary field winding of said motor for applying the uni-directional current output of said rectifier through said field winding of said motor in order to produce in said motor a field additive to the field produced by said main field winding thereby to maintain the motor field strength substantially constant for various armature currents, whereby the main field correction provided by the auxiliary winding of said motor is of a fixed polarity and is substantially proportional to the armature current irrespective of the direction of the motor armature rotation.

7. A drive system including a D.C. drive motor provided with an armature and a main field winding and an auxiliary field winding, a current source for said main field winding of a magnitude sufficient for saturating the field thereof with magnetic flux, a metadyne generator provided with an armature and a control field winding wherein the output armature current is substantially proportional to the input field current, a series connection between the armature of said generator and of said motor whereby the current through the motor armature is proportional to the current in the field winding of said generator, a control current source, and a connection from said control current source for applying the current output thereof through said generator control field winding and said auxiliary field winding so that the field produced by said auxiliary field winding is subtractive to the field produced by said main field winding whereby the current through the auxiliary field winding of said motor is substantially proportional to the current through the armature of said motor and the speed of the armature is maintained substantially independent of the load applied thereto.

8. A drive system including a D.C. drive motor provided with an armature and a main field winding and an auxiliary field winding, a current source for said main field winding of a magnitude to provide a magnetic flux through the motor field characteristic of weak field operation, a metadyne generator provided with an armature and a control field winding wherein the output armature current is substantially proportional to the input field current, a series connection between the armature of said generator and of said motor whereby the current through the motor armature is proportional to the current in the field winding of said generator, a control current source, and a connection from said control current source for applying the current output thereof through said generator control field winding and said auxiliary field winding so that the field generated by said auxiliary field winding is subtractive to the field produced by said main field winding, whereby the current through the auxiliary field winding of said motor is substantially proportional to the current through the armature of said motor and the armature speed is maintained substantially independent of the load applied thereto.

9. A drive system including a reversible D.C. drive motor provided with an armature and a main field winding and a first auxiliary winding and a second auxiliary field winding a current source for said main field winding, means interconnecting said current source and said main field winding for selectively controlling the current applied to said main field winding and thereby to control the intensity of the field produced thereby, a metadyne generator provided with an armature and a control field winding wherein the output armature current is substantially proportional to the input field current, a series connection between the armatures of said generator and of said motor whereby the current through the motor armature is proportional to the current in the field winding of said generator, a reversible current source, a bridge rectifier, a series connection between said reversible current control source and the input terminals of said bridge rectifier through the generator control field winding for applying the reversible current of said control source bi-directionally through said generator control field winding in order to control the direction of current flow in said motor armature in accordance with the direction of current flow from said reversible current control source thereby to control the direction of rotation of said motor armature, and switch means connected to the output terminals of said bridge rectifier for alternately completing a connection to said first auxiliary field winding and to said second auxiliary field winding and conjointly selecting the energization provided to the main field winding so that in the condition of maximum main field winding excitation one of said first and second auxiliary field windings are energized so as to provide a field subtractive to the field provided by the main field winding and in the condition of minimum excitation of the main field winding the other of said first and second auxiliary field windings is energized so as to provide a field that is additive to the field provided by the main field winding, whereby the main field correction provided by each of the first and second auxiliary field windings of said motor is of a fixed and opposed polarity and is substantially proportional to the armature current irrespective of the direction of motor armature rotation.

No references cited.